(12) United States Patent
Pomish

(10) Patent No.: US 10,906,556 B2
(45) Date of Patent: Feb. 2, 2021

(54) SYSTEM AND METHOD FOR ONCOMING VEHICLE WARNING

(71) Applicant: TOYOTA MOTOR ENGINEERING & MANUFACTURING NORTH AMERICA, INC., Plano, TX (US)

(72) Inventor: Ethan W. Pomish, Farmington Hills, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/371,971

(22) Filed: Apr. 1, 2019

(65) Prior Publication Data

US 2020/0307622 A1 Oct. 1, 2020

(51) Int. Cl.
| | |
|---|---|
| *B60W 50/16* | (2020.01) |
| *B60W 30/095* | (2012.01) |
| *G08G 1/16* | (2006.01) |
| *H04W 4/46* | (2018.01) |
| *G06K 9/00* | (2006.01) |
| *B60W 50/14* | (2020.01) |

(52) U.S. Cl.
CPC ........ *B60W 50/16* (2013.01); *B60W 30/0956* (2013.01); *G06K 9/00798* (2013.01); *G08G 1/162* (2013.01); *H04W 4/46* (2018.02); *B60W 2050/146* (2013.01); *B60W 2552/05* (2020.02); *B60W 2556/65* (2020.02)

(58) Field of Classification Search
CPC .................. B60W 30/09; G05D 2201/0213
See application file for complete search history.

(56) References Cited

U.S. PATENT DOCUMENTS

| | | | |
|---|---|---|---|
| 6,822,580 B2 | 11/2004 | Ewing et al. | |
| 7,095,136 B2 | 8/2006 | Rowledge | |
| 9,365,155 B2 | 6/2016 | Hathaway et al. | |
| 9,586,581 B2 | 3/2017 | Strauss et al. | |
| 2013/0321627 A1* | 12/2013 | Turn, Jr. | G06K 9/00805 348/148 |
| 2015/0161894 A1 | 6/2015 | Duncan et al. | |
| 2015/0371094 A1* | 12/2015 | Gardiner | E01C 23/01 348/148 |
| 2017/0345299 A1* | 11/2017 | Gupta | G08G 1/163 |
| 2018/0060986 A1* | 3/2018 | Suzuki | G06Q 50/26 |
| 2018/0208192 A1 | 7/2018 | Olsson | |
| 2018/0370528 A1* | 12/2018 | Rittger | B60W 30/0953 |
| 2019/0025853 A1* | 1/2019 | Julian | G06T 7/74 |
| 2019/0258248 A1* | 8/2019 | Moran | B60W 30/085 |

FOREIGN PATENT DOCUMENTS

DE 3332998 A1 3/1985

* cited by examiner

*Primary Examiner* — Fabricio R Murillo Garcia
(74) *Attorney, Agent, or Firm* — Oblon, McClelland, Maier & Neustadt, L.L.P.

(57) ABSTRACT

A method, a system, and computer readable medium for oncoming vehicle warning are provided. The method includes determining whether a vehicle is on an unpaved road; determining whether an oncoming vehicle is in a path of the vehicle based on communication data acquired from a communication system of the vehicle when the vehicle is on the unpaved road; and outputting an alert when the oncoming vehicle is in the path of the vehicle and the oncoming vehicle is out of a line-of-sight of the vehicle.

20 Claims, 6 Drawing Sheets

SYSTEM AND METHOD FOR ONCOMING VEHICLE WARNING

BACKGROUND

Various techniques may be used to reduce instances of vehicle collisions. Further, a vehicle may adjust a planned trajectory to avoid a collision. U.S. Pat. No. 9,586,581 B2 entitled "Method and distance control device for preventing collisions of a motor vehicle in a driving situation with little lateral distance" by Strauss et al. describes changing a driving direction based on a detected obstacle or an oncoming vehicle.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to an oncoming vehicle warning method that determines whether a vehicle is on an unpaved road; determines whether an oncoming vehicle is in a path of the vehicle based on communication data acquired from a communication system of the vehicle when the vehicle is on the unpaved road; and outputs an alert when the oncoming vehicle is in the path of the vehicle and the oncoming vehicle is out of a line-of-sight of the vehicle.

The present disclosure also relates to a system for oncoming vehicle warning. The system includes a communication system and a processor. The processor is configured to determine whether a vehicle is on an unpaved road, determine whether an oncoming vehicle is in a path of the vehicle based on communication data acquired from a communication system of the vehicle when the vehicle is on the unpaved road, and output an alert when the oncoming vehicle is in the path of the vehicle and the oncoming vehicle is out of a line-of-sight of the vehicle.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
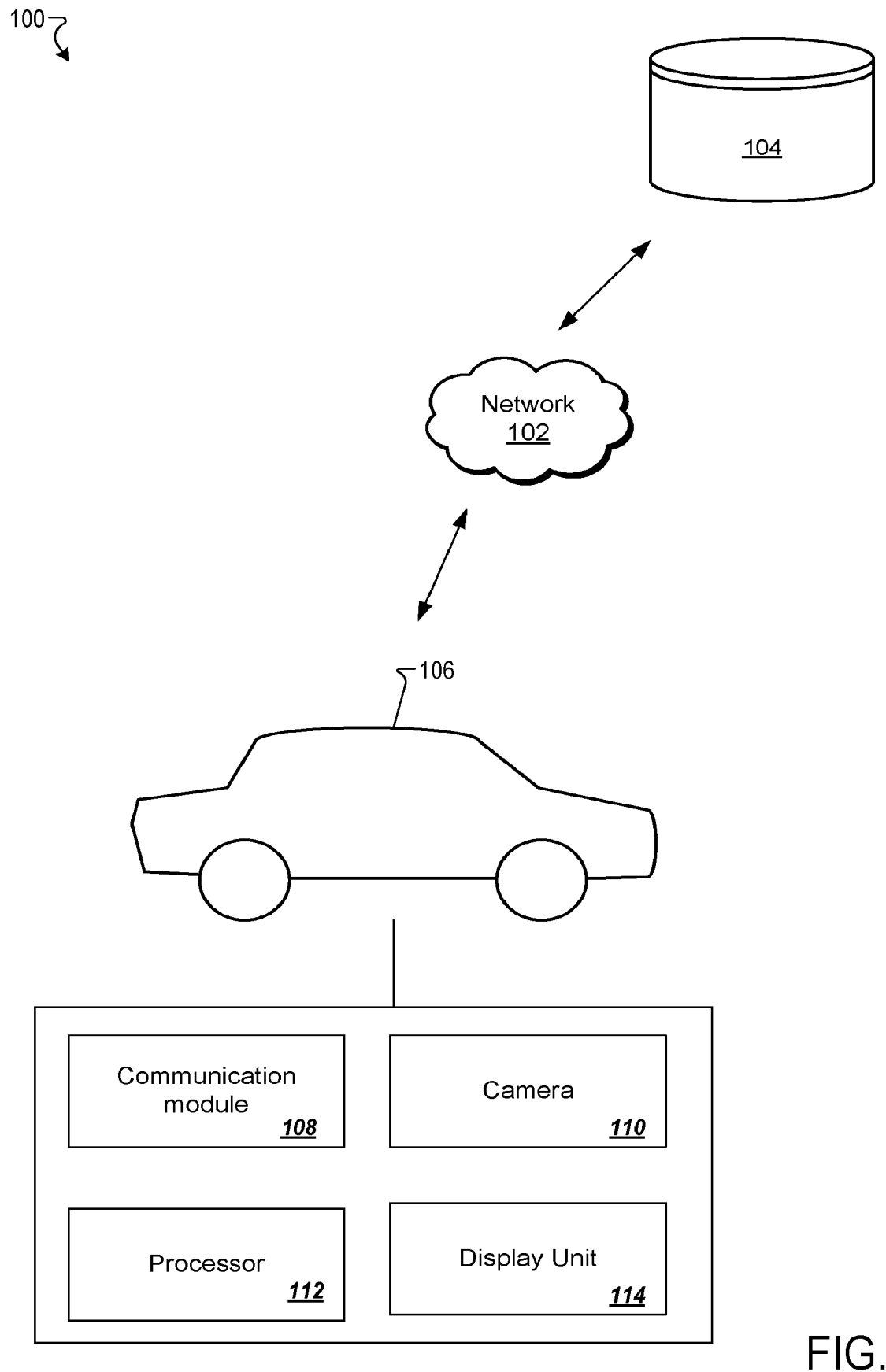
FIG. 1 is a schematic of a system environment according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a system and associated methodology for oncoming vehicle warning.

When traveling on dirt roads, drivers frequently maintain position in the center of the road for the smoothest ride due to the road surface being most free of damaging loose gravel. In less than ideal conditions (e.g., night time, dust, fog snow, rain, cresting a hill, or the like), it can be difficult to see oncoming vehicles. With oncoming vehicles maintaining the center of the road vehicles are likely on a collision course. The method and system described herein alert the driver of an oncoming vehicle if they are on a less-traveled dirt road or a road free of lane markings.

A host vehicle communicates with remote vehicles using vehicle-to-vehicle (V2V) and/or vehicle-to-everything (V2X) communication. If the vehicles are on an unpaved or unmarked road, a passive warning appears on the host vehicle when there is an opposing vehicle on the host vehicle's path as described below.

FIG. 1 is a schematic of a system environment 100 according to one example. The system may include a vehicle 106, a network 102, and a database 104. The vehicle 106 may include a communication module 108 (e.g., telematics module), a camera 110, a processor 112, and a display unit 114.

The vehicle 106 may be any type of vehicle such as a car, truck, bus, or motorcycle. The vehicle 106 may be gas-powered, diesel powered, electric, or solar-powered. The vehicle 106 may be actively operated by a driver or may be partially or completely autonomous or self-driving.

The network 102 is any network that allows the vehicle 106 to communicate information with other vehicles, the database 104, and the like. The network 102 may include conventional V2V communication over DSRC (Dedicated Short-Range Communications). Suitable DSRC V2V communication networks may include VANETs (Vehicular Ad hoc Networks). However, the network 102 may also include conventional communication services/networks that allow the vehicles 106 to communicate information with each other, such as over other computer networks. The network 102 may also include a V2V DSRC used in combination with the conventional communication services accessed by the vehicle 106.

Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access) or TDMA (Time Division Multiple Access), cellular phone networks, GPS (Global Positioning System), CDPD (Cellular digit packet data), Bluetooth radio, or an IEEE 802.11 based radio frequency.

The database 104 may represent one or more databases connected to the vehicle 106 via the network 102. The database 104 may store geographical information system (GPS) data including road information (e.g., road category, lane marking). The database 104 may be a cloud-based database. In one example, the database 104 of the system may be implemented in the memory of the processor 112.

The communication module 108 may be a direct communication module (DCM) that provides communications over a network to any server or other vehicles 106. The communication module 108 supports V2V communication with another vehicle. In one example, the communication module 108 is capable of accessing sensors and devices on vehicle 106 to both collect data about the vehicle and other vehicles effecting the position of the vehicles with respect to each other.

The camera 110 may represent one or more cameras configured to capture one or more images of a surface beneath and around the vehicle 106. The camera 110 may send the one or more images to the processor 112. The processor 112 analyzes the one or more images to determine whether road markings exist on the road. In one implementation, the camera 110 may capture a video. The processor 112 may analyze one or more video frames to determine whether one or more road markings are identified. For example, the processor 112 may determine whether a lane marking indicative of a center line is identified in the one or more video frames. In one example, the processor 112 may analyze the one or more images and/or the one or more video frames to determine a road category as described further below.

The display unit 114 may be a part of a head unit or a stand-alone unit. The display unit 114 may output driving information including alerts to the driver. The display unit 114 may include a speaker and a microphone. The user of the vehicle 106 may activate or deactivate the system using the display unit or via an oral command captured via the microphone.

The processor 112 may represent one or more processors in the vehicle 106. In one implementation, the processor 112 may be a server connected to the vehicle 106 via the network 102.

In one embodiment, the processor 112 may use location information of the vehicle 106 to determine the vehicle's geographical location. The location information of vehicle 106 can be determined via various satellite-based positioning systems known in the art, such as Global Positioning System (GPS). For example, the vehicle 106 may include a location detector. The location detector may be a GPS module for detecting a current geographical location of the vehicle. The location of the vehicle may be determined via a cellular tower with which communication has been established using current technology such as Global system for Mobile (GMS) localization, triangulation, Bluetooth, hotspots, WiFi detection, or other methods as would be understood by one of ordinary skill in the art.

Based on the location of the vehicle, the processor 112 may determine a category (i.e., type) of road. For example, the processor 112 may retrieve GPS data associated with the location of the vehicle from the database 104. The GPS data may include information about the category of the road and/or information about whether the road is marked (i.e., road markings). The data may further include a category of the road markings (e.g., a centerline marking, a sideline marking, and the like). The data may be stored in a table in the database 104. The processor 112 may retrieve the data by referencing the table using the GPS location.

In one implementation, the system described herein may be activated during deteriorating weather conditions. For example, when the edges of a road are icy/snowy the drivers tend to drive toward the middle of the road which increases the likelihood of head-on collisions. The processor 112 may detect the deteriorating weather conditions by connecting to a weather database via the network 102. The processor 112 may also detect weather conditions using sensors of the vehicle 106 and/or using one or more images captured via the camera 110.

In one implementation, the processor 112 may activate the collision warning system described herein in response to detecting a road marking (e.g., center line) indicative of the vehicle driving in the middle of the road. For example, the processor 112 may analyze one or more images captured via the camera 110 to determine whether the road marking are beneath the vehicle and/or within a predetermined distance from the vehicle 106.

In one implementation, the processor 112 may output an alert when the oncoming vehicle is not in the field of view of the driver. For example, the processor 112 may determine whether the oncoming vehicle is visible to the driver based on the topology of the road. In response to determining that the oncoming vehicle is not visible to the driver, the alert may be outputted.

In one implementation, the processor 112 may deactivate the collision warning system in response to detecting a change from a first road category to a second road category. For example, the processor 112 may deactivate the system when the detected surface beneath the vehicle changes from a gravel road to an asphalt or concrete road (e.g., identified using one or more images captured via the camera 110). In one example, the system is deactivated when GPS data indicates that the vehicle is on an asphalt road or a concrete road.

The modules described herein may be implemented as either software and/or hardware modules and may be stored in any type of computer-readable medium or other computer storage device. For example, each of the modules described herein may be implemented in circuitry that is programmable (e.g., microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programing language such as Java, C, or assembly. One or more software instructions in the modules may be embedded in firmware, such as an erasable programmable read-only memory (EPROM).

Figure 2A:
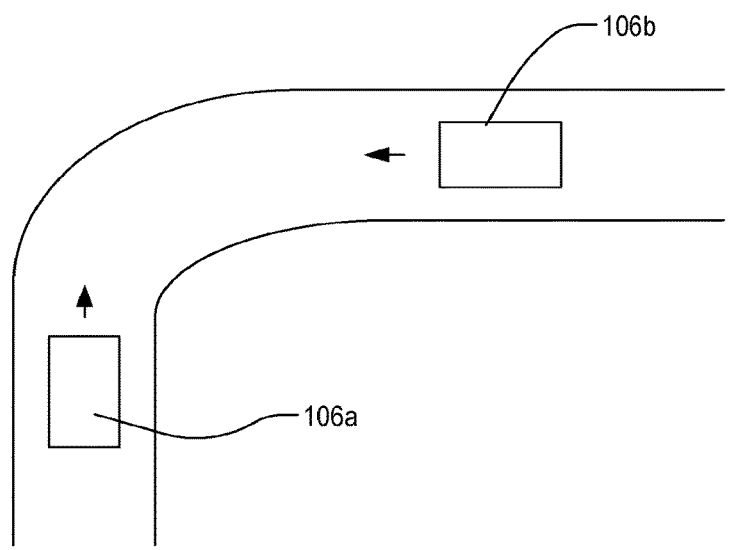
FIG. 2A is a schematic that shows an application of the system according to one example.
Figure 2B:
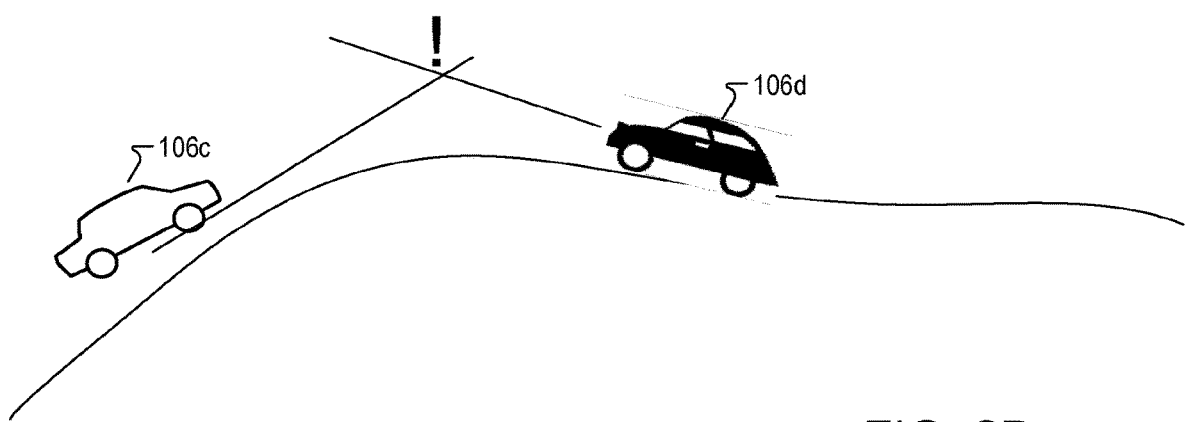
FIG. 2B is a schematic that shows an application of the system according to another example.

Due to loose material on the edge of rural/dirt roads or lack of well-defined lane markers, drivers frequently drive along the center of the road. Obstructions to visibility of oncoming vehicles, like hills or curves, can put two oncoming vehicles on a collision course as described previously herein. The system described herein alerts the driver of oncoming vehicles on rural roads to give them adequate warning to take evasive action and prevent head-on collision. Exemplary applications of the system are shown in FIGS. 2A-2B.

Figure 3:
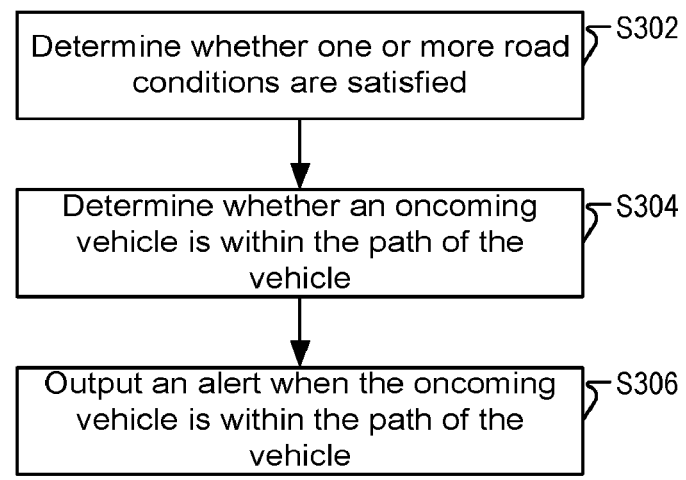
FIG. 3 is a flowchart for a process for outputting an alert to a driver according to one example.

FIG. 3 is an algorithmic flow chart for a process 300 for outputting an alert to a driver using the system 100 according to one example.

At step S302, the processor 112 may determine whether one or more conditions are satisfied. The conditions may include a system activation status, a road condition, an environmental condition, and the like. The system activation status may be based on road conditions, a user input, environmental conditions, and the like. The system activation status may be automatically updated by the processor 112 as described previously herein. In other examples, the system is activated manually by a user of the vehicle 106. For example, the user may activate the system whether or not the vehicle is on a dirt road or an unmarked road. In one example, the processor 112 may execute process 500 shown and described in FIG. 5.

At step S304, the processor 112 may detect whether one or more vehicles are in the surrounding of the vehicle 106. In one example, the processor 112 may detect other vehicles using V2V communications or other methods as recognized by one of ordinary skill in the art.

At step S306, the processor 112 may output an alert via the display unit 114 of the vehicle 106 in response to detecting an oncoming vehicle in the path of vehicle and/or within a predetermined distance from the vehicle 106. V2V is used to determine the headings of the oncoming vehicle and the vehicle 106 and their respective position. In one implementation, an alert may be output in the vehicle 106 and in the oncoming vehicle. For example, the vehicle 106 may output a signal to the oncoming vehicle indicative of the possible collision. The signal may activate an alert or warning in the oncoming vehicle. In one implementation, the vehicle 106 may avoid the oncoming vehicle by altering the trajectory (of the vehicle 106) via one or more autonomous driving systems.

Figure 4:
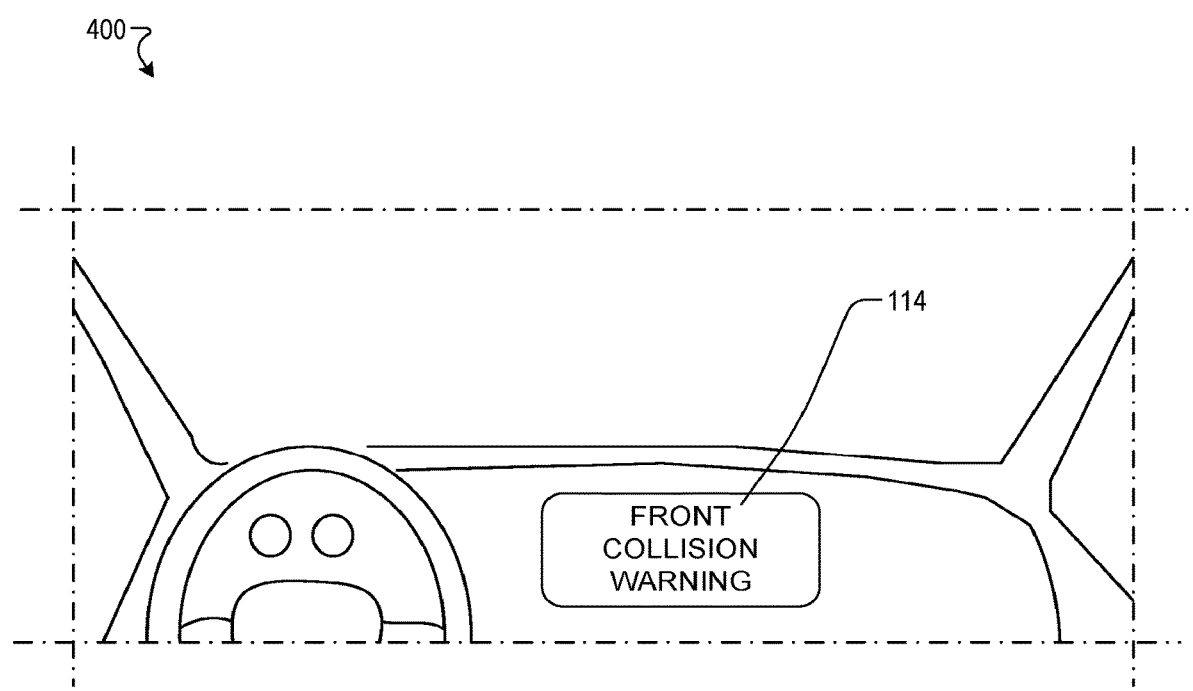
FIG. 4 is a schematic that shows a display unit according to one example.

The alerts may be in an audio format, in a visual format, in a tactile format, or any combination thereof. FIG. 4 is a schematic that shows a display unit 114 according to one example. Schematic 400 shows the alert in a text form. In other examples, the alert may be in an image form. The alert may also be tactile (e.g., steering wheel vibration, seat vibration) or audible (e.g., via the speaker).

The vehicle alerts the driver of the specified conditions/dangers. For example, the alert may display an approximate distance between the two vehicles.

In one implementation, different levels of warnings/alerts may be output by the system (e.g., display unit) based on the distance. For example, the system may output a first alert in a visual form. Then, the system may output a second alert in an audio form in response to determining that the distance between the vehicle 106 and the oncoming vehicle is decreasing. In one implementation, different audio volume may be associated with the different levels of warnings. For example, the audio volume may be inversely proportional to the distance between the vehicle 106 and the oncoming vehicle (i.e., the volume increases as the distance decreases).

In one implementation, the alert may be output via an electronic device associated with the user. For example, a signal may be sent from the processor 112 to a smartphone associated with the user. The signal causes the smartphone to display the alert. In one example, the alert is displayed on the smartphone in response to detecting that the driver is using the smartphone and/or when the smartphone is connected to the vehicle 106 via the network 102.

Figure 5:
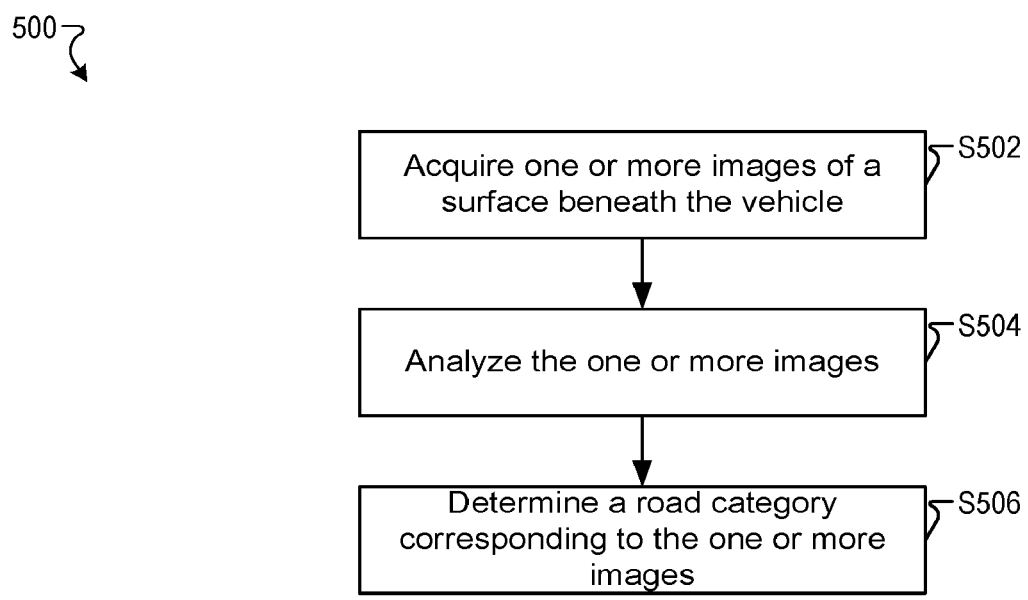
FIG. 5 is a flowchart for a process for identifying a road category according to one example.

FIG. 5 is an algorithmic flowchart of a process 500 for identifying a road category according to one example. At step S502, the processor 112 may acquire one or more images of the surface beneath the vehicle 106. The one or more images may also include images of the edge of the roads.

At step S504, the processor 112 may analyze the acquired one or more images to determine the road category. The processor 112 may compare the acquired one or more images with images associated with predetermined road categories using image processing and recognition techniques as would be recognized by one of ordinary skill in the art. The road categories may include dirt road, gravel road, concrete road, and the like. The road categories may also include snow road, icy road, and the like. The images associated with the predetermined road categories may be stored in a memory of the vehicle 106 and/or the database 104. For example, an image of a gravel road may be associated with the "gravel road" category. In one example, multiple images are associated with each road category. The processor 112 may determine a similarity score between each of the predetermined categories and the acquired one or more images.

At step S506, the processor 112 may identify the category based on the similarity scores determined at S504. For example, the road category may be identified as the category having the highest similarity score. In one implementation, the processor 112 may activate the system based on the identified road category and user preferred settings. For example, the system is activated when a gravel or dirt road is detected. In other implementations, the processor 112 may deactivate the system based on the identified category. For example, the processor 112 may deactivate the system when a concrete road is detected.

A system which includes the features in the foregoing description provides numerous advantages to users. In particular, the system minimizes false positive triggers of the alarm as the system is activated on dirt road or when no lane marking is detected. The system reduces the risk of head-on collisions by alerting the driver when oncoming vehicles are detected.

Figure 6:
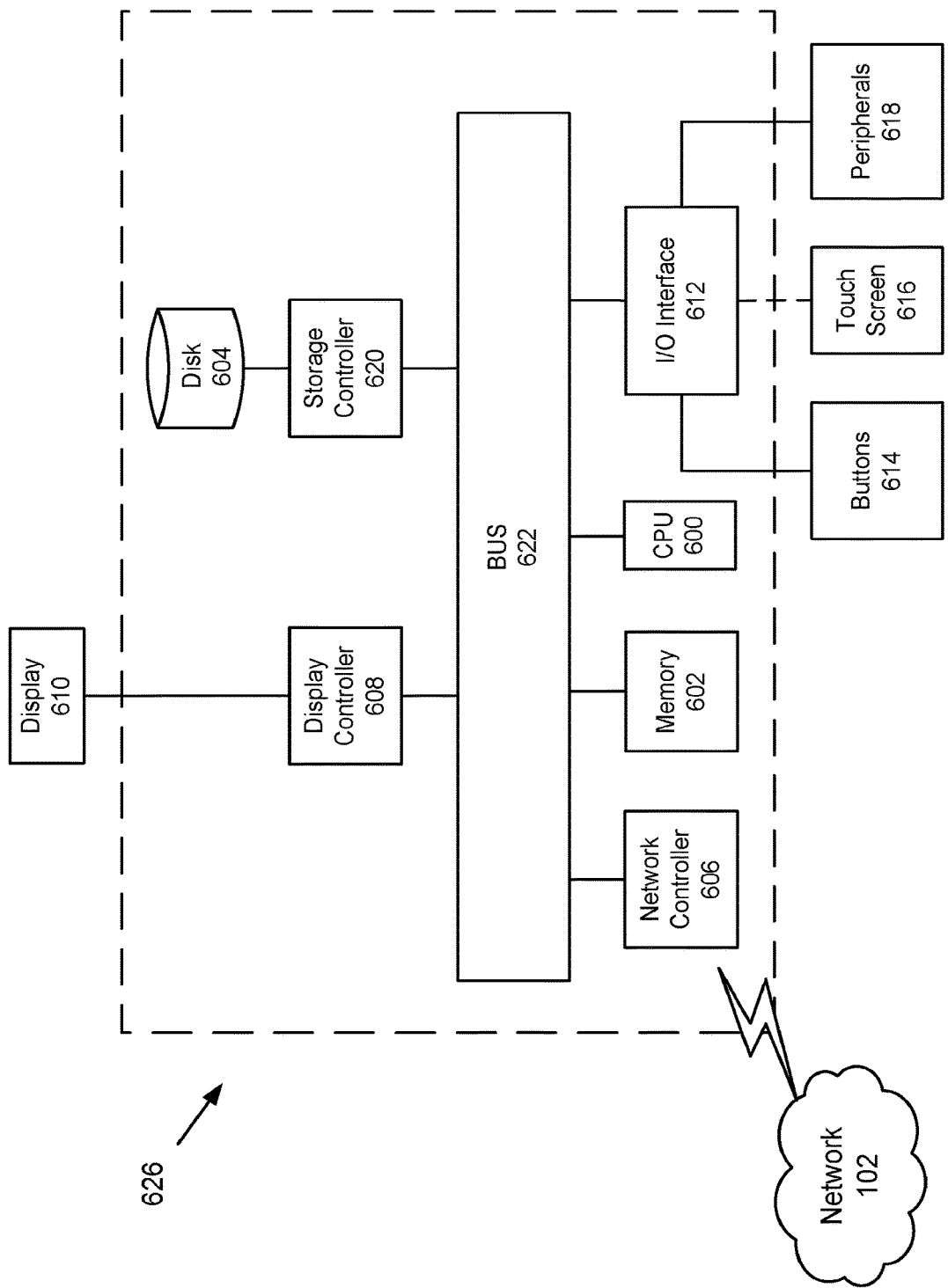
FIG. 6 is a block diagram of a computer according to one example.

In one implementation, the functions and processes of the processor 112 may be implemented by a computer 626. The vehicle 106 may include one or more on board computers. Next, a hardware description of the computer 626 according to exemplary embodiments is described with reference to FIG. 6. In FIG. 6, the computer 626 includes a CPU 600 which performs the processes described herein. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 626 communicates, such as a server or computer.

Further, the claimed advancements may be provided as a utility application, background daemon, or component of an operating system, or combination thereof, executing in conjunction with CPU 600 and an operating system such as Microsoft® Windows®, UNIX®, Oracle® Solaris, LINUX®, Apple macOS® and other systems known to those skilled in the art.

In order to achieve the computer 626, the hardware elements may be realized by various circuitry elements, known to those skilled in the art. For example, CPU 600 may be a Xenon® or Core® processor from Intel Corporation of America or an Opteron® processor from AMD of America, or may be other processor types that would be recognized by one of ordinary skill in the art. Alternatively, the CPU600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The computer 626 in FIG. 6 also includes a network controller 606, such as an Intel Ethernet PRO network interface card from Intel Corporation of America, for interfacing with network 102. As can be appreciated, the network 102 can be a public network, such as the Internet, or a private network such as LAN or WAN network, or any combination thereof and can also include PSTN or ISDN sub-networks. The network 102 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 626 further includes a display controller 608, such as a NVIDIA® GeForce® GTX or Quadro® graphics adaptor from NVIDIA Corporation of America for interfacing with display 610, such as display unit 114. A general purpose I/O interface 612 interfaces with a keyboard and/or mouse 614 as well as an optional touch screen panel 616 on or separate from display 610.

The general purpose storage controller 620 connects the storage medium disk 604 with communication bus 622, which may be an ISA, EISA, VESA, PCI, or similar, for interconnecting all of the components of the computer 626. A description of the general features and functionality of the display 610, keyboard and/or mouse 614, as well as the display controller 608, storage controller 620, network controller 606, and general purpose I/O interface 612 is omitted herein for brevity as these features are known.

Vehicle 106 also includes various internal networks for interconnecting several vehicle devices within the vehicle as will be discussed below. External devices may include mobile devices, electronic devices in networked systems (e.g., servers or clients in a local area network (LAN), etc.), on board computers of other vehicles etc. In-vehicle mobile devices are devices which are located within, or in the vicinity of the vehicle 106 such that the in-vehicle mobile device can communicate directly with internal networks of the vehicle 106.

The vehicle 106 may include temperature sensors, photosensors, position sensors, speed sensors, angle sensors or any other sensor for detecting a diagnostic condition or other parameter of the vehicle 106 or its ambient environment.

The vehicle 106 may include multiple internal vehicle networks to provide communication pathways to various vehicle devices distributed throughout the vehicle 106. Vehicle networks typically include hard wired bus type networks, each providing communication pathways to particular vehicle devices distributed throughout a vehicle (e.g., Controller Area Network (CAN), Local Internet Network (LIN), Flexray bus, and Media Oriented System Transport (MOST) network).

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for oncoming vehicle warning, the method comprising:
   determining, using processing circuitry, whether a vehicle is currently on a paved road with a centerline or an unpaved road based on, at least in part, global positioning information related to the vehicle;
   determining current weather conditions surrounding the vehicle;
   upon determining that the vehicle is on the unpaved road and under an unfavorable weather condition of the determined current weather conditions, activating an alert system, on the vehicle, to output a first alert to a user of the vehicle:
   wherein the alert system;
   determines, using the processing circuitry, whether an oncoming vehicle is in a path of the vehicle based on communication data acquired from a communication system of the vehicle in response to determining that the vehicle is on the unpaved road and under the unfavorable weather condition, and
   outputs, to the user, a second alert in response to determining that the oncoming vehicle is in the path of the vehicle and the oncoming vehicle is out of a line-of-sight of the vehicle while the vehicle is on the unpaved road and under the unfavorable weather condition; and
   upon determining that the vehicle is on the paved road with a centerline, after being on the unpaved road, and no oncoming vehicles are in the path of the vehicle, deactivating the alert system.

2. The method of claim 1, further comprising:
determining whether the vehicle is currently on the unpaved road based on images captured via a camera of the vehicle or lane identification technology.

3. The method of claim 2, further comprising:
acquiring one or more images of a surface beneath the vehicle via the camera of the vehicle; and
comparing the one or more images to prestored images associated with a plurality of road categories indicative of whether a road is paved.

4. The method of claim 1, further comprising:
acquiring one or more images of a surface beneath the vehicle via a camera of the vehicle;
analyzing the one or more images to identify a marking indicative of a center line; and
outputting the alert in response to identifying the marking.

5. The method of claim 1, wherein the communication system includes at least one of a vehicle-to-vehicle (V2V) communication system or a vehicle-to-everything (V2X) communication system.

6. The method of claim 1, wherein the alert is in a visual format, in an audio format, or in a tactical format.

7. The method of claim 1, wherein the alert includes a plurality of alert levels.

8. The method of claim 7, further comprising:
outputting a third alert at a higher level than the second alert in response to determining that a distance between the vehicle and the oncoming vehicle is decreasing.

9. The method of claim 1, further comprising:
determining whether the oncoming vehicle is out of the line-of-sight of the vehicle based on a road topology.

10. The method of claim 9, wherein the road topology is retrieved from a database based on a vehicle location.

11. The method of claim 1, further comprising:
outputting the alert via an external device.

12. A system for oncoming vehicle warning, the system comprising:
a communication system of a vehicle; and
a processor configured to
determine whether the vehicle is currently on a paved road with a centerline or an unpaved road based on, at least in part, global positioning information related to the vehicle,
determine current weather conditions surrounding the vehicle,
upon determining that the vehicle is on the unpaved road and under an unfavorable weather condition of the determined weather conditions, activate an alert system, on the vehicle, to output a first alert to a user of the vehicle;
wherein the alert system is configured to
determine whether an oncoming vehicle is in a path of the vehicle based on communication data acquired from the communication system of the vehicle in response to determining that the vehicle is on the unpaved road and under the unfavorable weather condition, and
output, to the user, a second alert in response to determining that the oncoming vehicle is in the path of the vehicle and the oncoming vehicle is out of a line-of-sight of the vehicle while the vehicle is on the unpaved road and under the unfavorable weather condition, and
upon determining that the vehicle is on the paved road with a centerline, after being on the unpaved road, and no oncoming vehicles are in the path of the vehicle, deactivate the alert system.

13. The system of claim 12, wherein the processor is further configured to:
determine whether the vehicle is currently on the unpaved road based on images captured via a camera of the vehicle or lane identification technology.

14. The system of claim 13, wherein the processor is further configured to:
acquire one or more images of a surface beneath the vehicle via the camera of the vehicle; and
compare the one or more images to prestored images associated with a plurality of road categories indicative of whether a road is paved.

15. The system of claim 12, wherein the processor is further configured to:
acquire one or more images of a surface beneath the vehicle via a camera of the vehicle;
analyze the one or more images to identify a marking indicative of a center line; and
output the alert in response to identifying the marking.

16. The system of claim 12, Wherein the communication system includes at least one of a vehicle-to-vehicle (V2V) communication system a or a vehicle-to-everything (V2X) communication system.

17. The system of claim 12, wherein the alert is in a visual format, in an audio format, or in a tactical format.

18. The system of claim 12, wherein the alert includes a plurality of alert levels.

19. The system of claim 12, wherein the processing circuitry is further configured to:
determine whether the oncoming vehicle is out of the line-of-sight of the vehicle based on a road topology.

20. A non-transitory computer readable medium storing computer-readable instructions therein which when executed by a computer cause the computer to perform a method for oncoming vehicle warning, the method comprising:
determining whether a vehicle is currently on a paved road with a centerline or an unpaved road based on, at least in part, global positioning information related to the vehicle;
determining current weather conditions surrounding the vehicle;
upon determining that the vehicle is on the unpaved road and under an unfavorable weather condition of the determined weather conditions, activating an alert system, on the vehicle, to output a first alert to a user of the vehicle;
wherein the alert system;
determines, using the processing circuitry, whether an oncoming vehicle is in a path of the vehicle based on communication data acquired from a communication system of the vehicle in response to determining that the vehicle is on the unpaved road and under the unfavorable weather condition, and
outputting outputs, to the user, a second alert in response to determining that the oncoming vehicle is in the path of the vehicle and the oncoming vehicle is out of a line-of-sight of the vehicle while the vehicle is on the unpaved road and under the unfavorable weather condition; and
upon determining that the vehicle is on the paved road with a centerline, after being on the unpaved road, and no oncoming vehicles are in the path of the vehicle, deactivating the alert system.

* * * * *